Jan. 3, 1928.
J. L. ROOD
1,654,605
TURBINE
Filed May 18, 1925
2 Sheets-Sheet 2
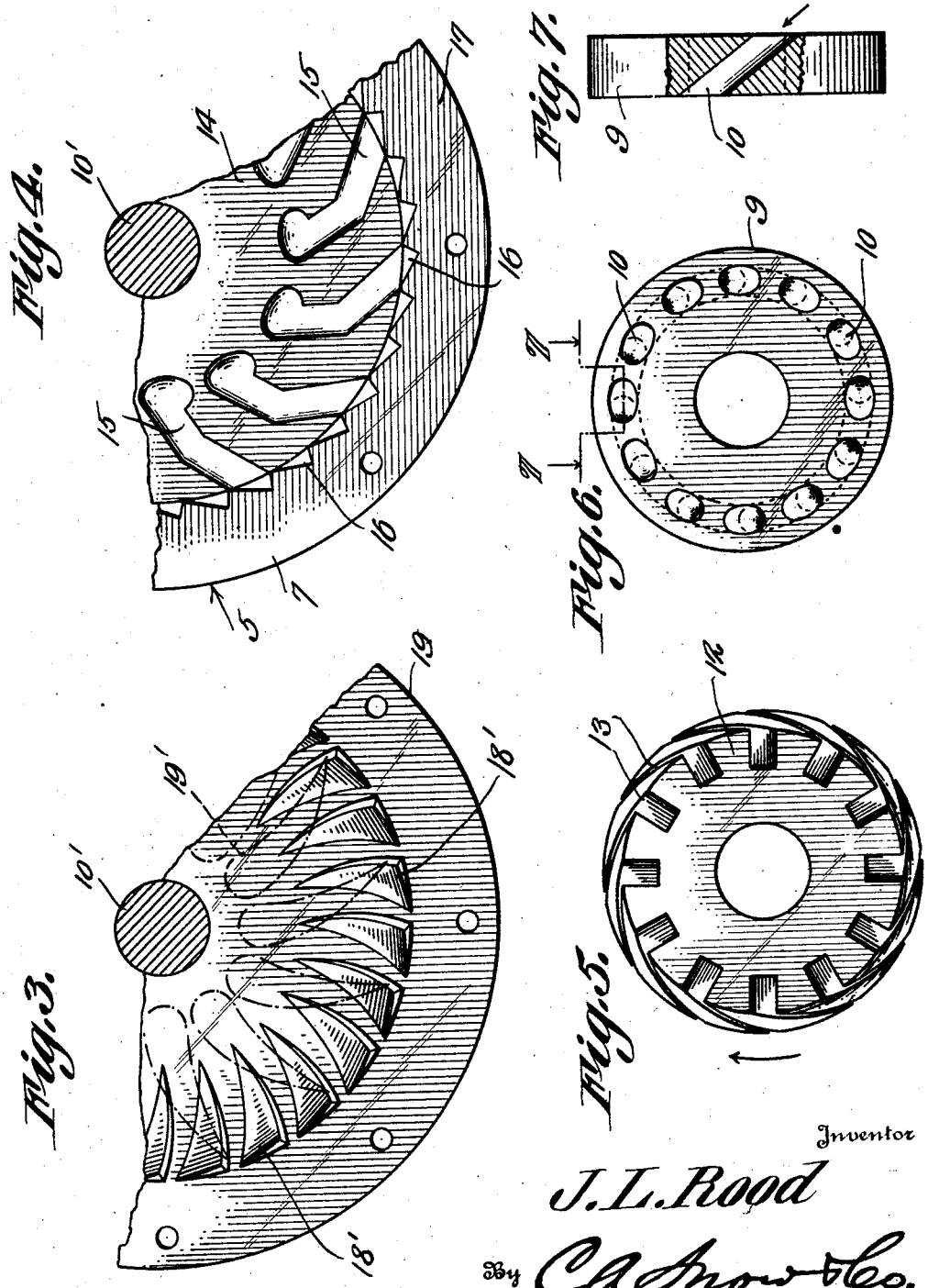
Inventor
J. L. Rood
By C. A. Snow & Co.
Attorneys Patented Jan. 3, 1928.

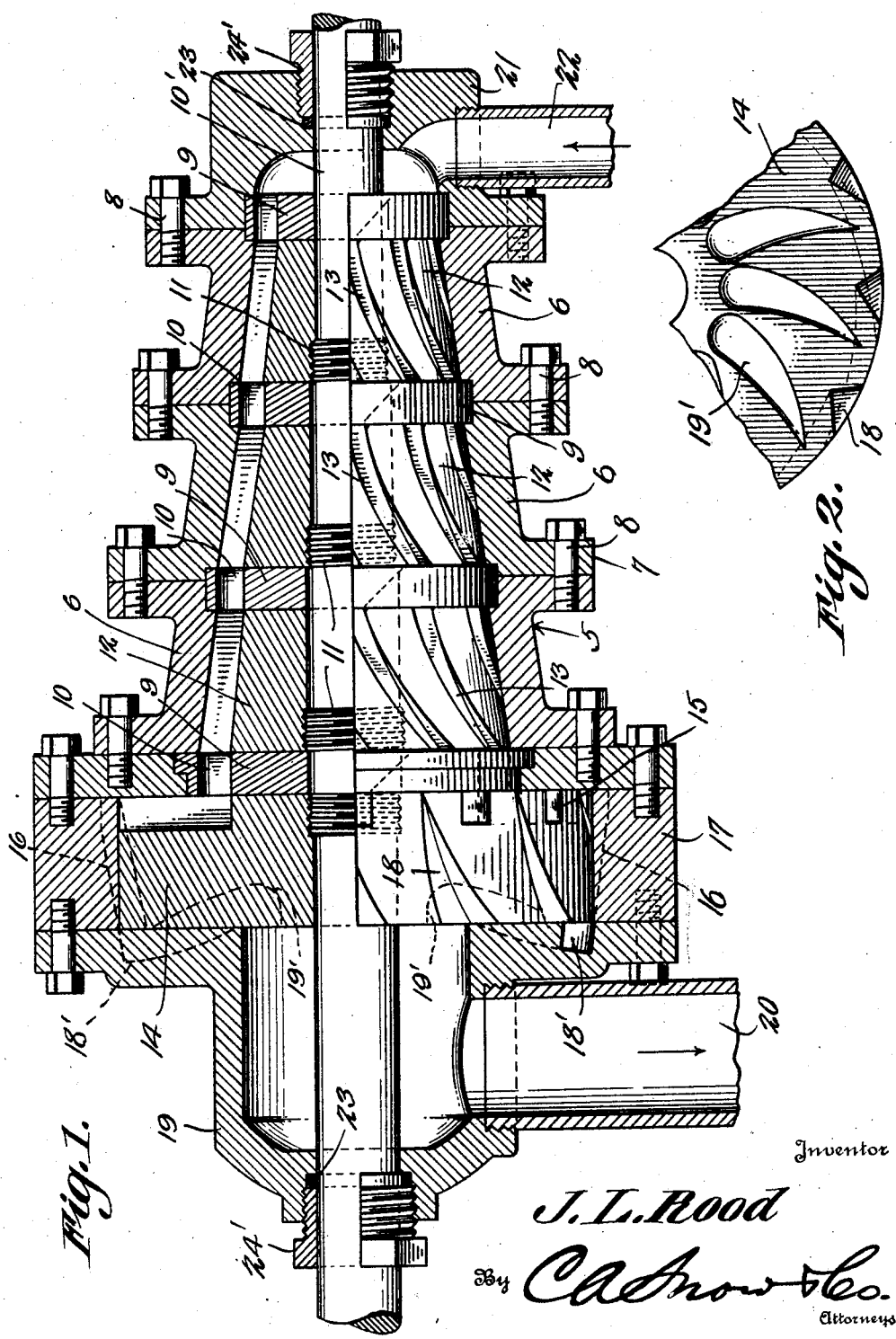

1,654,605

UNITED STATES PATENT OFFICE.

JOHN LYMAN ROOD, OF TRAVERSE CITY, MICHIGAN.

TURBINE.

Application filed May 18, 1925. Serial No. 31,070.

This invention relates to turbines and aims to provide a turbine of a novel construction to reduce the end thrust of the rotors incident to the fluid passing through the spirally formed grooves thereof.

A further object of the invention is to provide a construction which will insure a continuous expanding flow of fluid from the entrance end of the turbine to the exhaust end thereof, thereby insuring a smooth operation of the turbine to accomplish its purpose.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a turbine constructed in accordance with the invention.

Figure 2 is a fragmental elevational view of the rotor arranged adjacent to the discharge end of the turbine.

Figure 3 is a fragmental elevational view of the inner surface of the end member at one extremity of the turbine.

Figure 4 is a fragmental elevational view of the rotor at the discharge end of the turbine illustrating the construction of the forward surface of the end rotor.

Figure 5 is an elevational view of one of the rotors.

Figure 6 is an elevational view of one of the stationary elements or stators.

Figure 7 is a sectional view taken on line 7—7 of Figure 6.

Referring to the drawings in detail, the casing of the turbine is indicated generally by the reference character 5 and includes a plurality of tapered sections 6 which are provided with flanges 7 formed with openings to accommodate the bolts 8 that secure the various sections together.

These sections taper towards the entrance end of the casing 5, so that fluid entering the turbine will be held in a restricted area and permitted to expand, as it passes towards the exhaust end of the turbine. Each of the sections 6 is formed with cut out portions disposed at its ends, which cut out portions accommodate the stationary members or stators 9, which are provided with openings 10 arranged at oblique angles with respect to the outer and inner faces thereof, so that fluid passing therethrough will be directed in an angular direction.

The members 9 are provided with central openings to accommodate the shaft 10' which is formed with threaded portions 11 arranged in suitable spaced relation with each other throughout the length of the shaft 10', which threaded portions are adapted to be positioned in the threaded ends of the bores of the rotors 12 to secure the rotors 12 to the shaft in a manner to cause the shaft to move with the rotors.

The rotors are also tapered in formation to correspond to the taper of the casing. The rotors 12 have channels 13 formed in the peripheries thereof, which channels extend at oblique angles with the faces of the rotors, to the end that fluid entering the rotors will engage the walls of the channels imparting a rotary movement to the rotors to accomplish the purpose of the invention.

Disposed at the discharge end of the turbine is a relatively large rotor 14 which is provided with channels 15 disposed in the inner surface thereof, which channels 15 communicate with the openings 10 of the stator 9 arranged adjacent thereto. As shown, the channels 15 extend at oblique angles with respect to the sidefaces of the rotor 14 and have their outer ends terminating at the periphery of the rotor to direct fluid into the cut out portions or pockets 16 provided in the stator 17 which in turn direct the fluid inwardly and into the grooves 18 provided in the periphery of the rotor 14, from where the fluid is directed to the grooves 18' of the head 19 of the casing of the turbine which grooves 18' extend inwardly towards the shaft 10' as clearly shown by Figure 1 of the drawings.

In the outer side surface of rotor 14 are curved grooves 19' that receive fluid from the grooves 18' from where the fluid discharges into the pipe 20, which carries spent fluid from the rotor.

At the opposite end of the rotor is a head 21 formed with an opening to accommodate the supply pipes 22 which direct fluid to the turbine. In order that a fluid-tight connection may be maintained between the shaft 10' and end members 19 and 21 of the turbine packing 23 is provided as surrounding the shaft 10' and held in position by means of the glands 24'.

From the foregoing it will be obvious that fluid passing into the casing through the pipe 22 will be directed through the stators 9 and into the grooves of the rotors, imparting rotary movement thereto, which in turn impart rotary movement to the shaft 10'.

As the fluid passes to the rotor 14 it will be seen that the fluid is directed outwardly towards the periphery thereof where it strikes the pockets 16 of the bearing member 17 from where the fluid is directed inwardly towards the shaft 10' and out through the pipe 20.

I claim:—

A turbine embodying a sectional tapered casing, the adjacent edges of the sections being cut away, stators removably supported within the cut away portions, said stators having obliquely disposed openings arranged adjacent to their peripheries, a shaft extending through the casing and stators, rotors secured to the shaft between the stators, said rotors having channels in the peripheries thereof, and disposed at oblique angles in directions opposite to the openings of the stators, a rotor relatively large in respect to the preceding rotors at the lower pressure end of the casing, and secured to the shaft, the latter rotor having channels formed in one face thereof and adapted to communicate with the openings of the stator adjacent thereto, the last mentioned rotor having peripheral grooves communicating with the channels and having grooves in the outer surface thereof, a stator surrounding the latter rotor and having grooves cooperating with the grooves in the last mentioned rotor, and means for directing fluid under pressure to the casing.

In testimony that I claim the foregoing as my own, I have hereto affixed my signature.

JOHN LYMAN ROOD.